US009813585B2

(12) United States Patent
Kuribara

(10) Patent No.: US 9,813,585 B2
(45) Date of Patent: Nov. 7, 2017

(54) IMAGE FORMING APPARATUS WITH REMOTE MAINTENANCE MODE

(71) Applicant: Oki Data Corporation, Tokyo (JP)

(72) Inventor: Nobuhiro Kuribara, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/962,754

(22) Filed: Dec. 8, 2015

(65) Prior Publication Data

US 2016/0286076 A1 Sep. 29, 2016

(30) Foreign Application Priority Data

Mar. 23, 2015 (JP) ................................ 2015-060225

(51) Int. Cl.
*H04N 1/00* (2006.01)
*H04N 1/327* (2006.01)

(52) U.S. Cl.
CPC ..... *H04N 1/32771* (2013.01); *H04N 1/00344* (2013.01); *H04N 1/00411* (2013.01); *H04N 2201/0094* (2013.01); *H04N 2201/33307* (2013.01)

(58) Field of Classification Search
None
See application file for complete search history.

(56) References Cited

U.S. PATENT DOCUMENTS

| 2006/0161639 | A1* | 7/2006 | Kato | H04L 29/06 709/219 |
| 2010/0198967 | A1* | 8/2010 | Takahashi | H04N 1/00344 709/224 |
| 2011/0051189 | A1* | 3/2011 | Suga | H04N 1/00832 358/1.15 |
| 2013/0329255 | A1* | 12/2013 | Inoue | G06K 15/4055 358/1.15 |

FOREIGN PATENT DOCUMENTS

JP 2005-271406 A 10/2005

\* cited by examiner

*Primary Examiner* — Andrew H Lam
(74) *Attorney, Agent, or Firm* — Muncy, Geissler, Olds & Lowe, P.C.

(57) ABSTRACT

An image forming apparatus includes an operation unit, a management unit, a communication unit, a restricting unit, and a control unit. The operation unit receives an input signal based on a user input. The management unit manages a plurality of modes of the image forming apparatus. The plurality of modes includes a first mode and a second mode. The second mode is for remote maintenance. The communication unit transmits connection request data to a maintenance apparatus. The restricting unit restricts communication with an external apparatus. Upon receipt of the input signal, the control unit controls the management unit to shift a current mode of the image forming apparatus from the first mode to the second mode, controls the communication unit to transmit the connection request data to the maintenance apparatus, and controls the restricting unit to restrict the communication with the external apparatus.

45 Claims, 7 Drawing Sheets

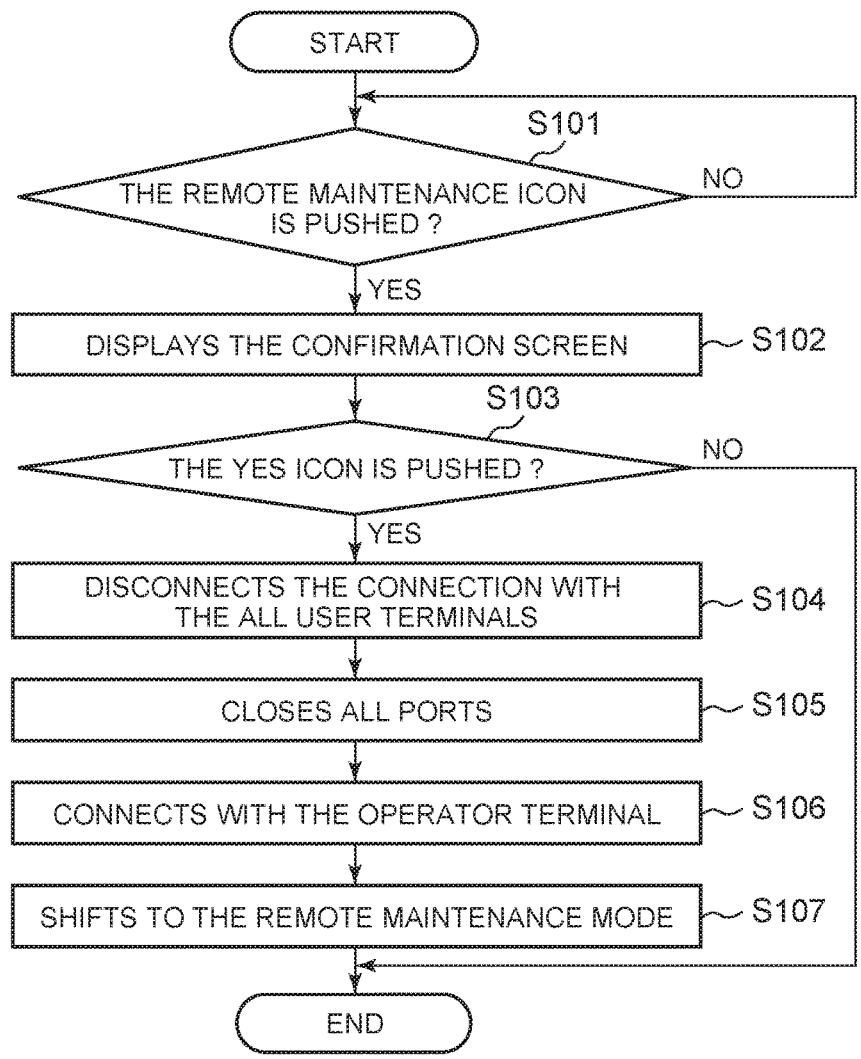

IMAGE FORMING APPARATUS WITH REMOTE MAINTENANCE MODE

CROSS REFERENCE TO RELATED APPLICATIONS

This application claims priority under 35 USC 119 to Japanese Patent Application No. 2015-060225 filed on Mar. 23, 2015, the entire contents which are incorporated herein by reference.

BACKGROUND OF THE INVENTION

1. Field of the Invention

This application relates to an image forming apparatus connected to a maintenance apparatus.

2. Description of Related Art

A conventional image forming apparatus is connected to a maintenance apparatus. The conventional image forming apparatus transmits maintenance information. Then the conventional image forming apparatus receives an instruction signal from the maintenance apparatus. The conventional image forming apparatus executes processing for maintenance of the conventional image forming apparatus based on the instruction signal (see, for example, Japanese Laid-open Patent Publication No. 2005-271406). This is called "remote maintenance".

However, if the image forming apparatus receives a print job from a user terminal while the remote maintenance is executed, the remote maintenance is disturbed.

SUMMARY OF THE INVENTION

According to an aspect of the disclosed embodiment, an image forming apparatus includes an operation unit, a management unit, a communication unit, a restricting unit, and a control unit. The operation unit receives an input signal based on a user input. The management unit manages a plurality of modes of the image forming apparatus. The plurality of modes includes a first mode and a second mode. The second mode is for remote maintenance. The communication unit transmits connection request data to a maintenance apparatus. The restricting unit restricts communication with an external apparatus. Upon receipt of the input signal, the control unit controls the management unit to shift a current mode of the image forming apparatus from the first mode to the second mode, controls the communication unit to transmit the connection request data to the maintenance apparatus, and controls the restricting unit to restrict the communication with the external apparatus.

According to this embodiment, the remote maintenance is not disturbed.

BRIEF DESCRIPTION OF THE DRAWINGS

In the attached drawings:

FIG. 3 is a schematic view showing the connection management information;

FIG. 4 is a flowchart showing mode shift processing executed by the image forming apparatus according to the first embodiment;

DETAILED DESCRIPTION OF EMBODIMENTS

Hereinafter, preferred embodiments of the invention will be described with reference to the attached drawings.

1. First Embodiment

Figure 1:
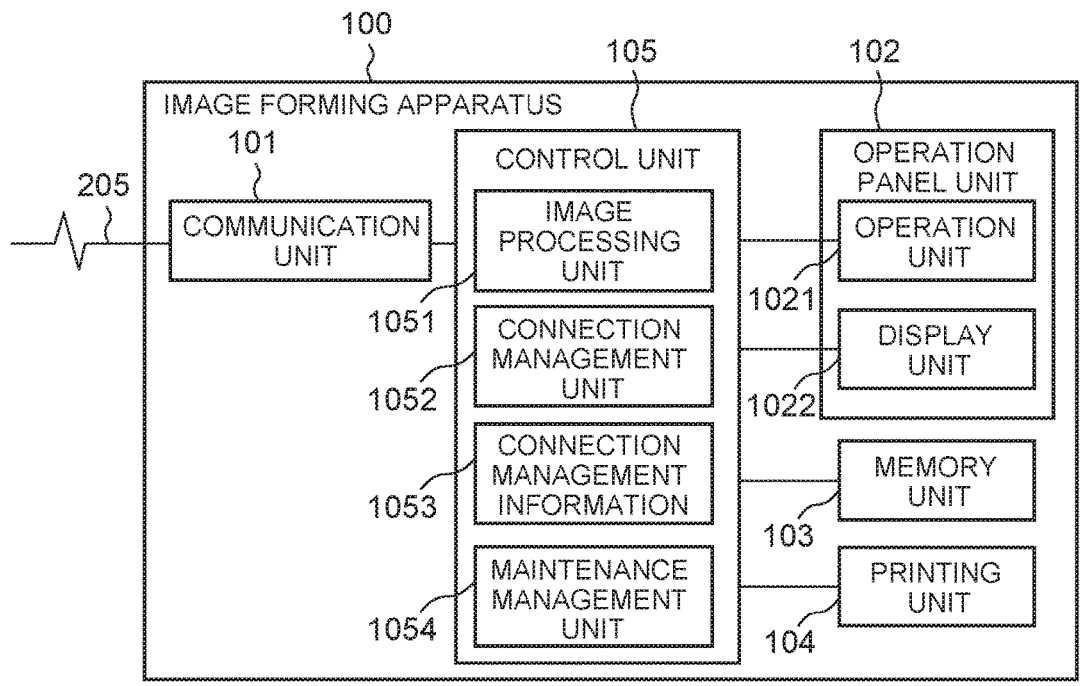
FIG. 1 is a block diagram showing a configuration of an image forming apparatus according to a first embodiment.

FIG. 1 is a block diagram showing a configuration of an image forming apparatus 100.

As shown in FIG. 1, the image forming apparatus 100 is connected to a LAN (Local Area Network) 205 as a communication line. The image forming apparatus 100 may be a multifunction machine.

The image forming apparatus 100 may include a communication unit 101, an operation panel unit 102, a memory unit 103, a printing unit 104, and a control unit 105.

The communication unit 101 may include a transmission unit and a receiving unit. The transmission unit transmits data to an external apparatus through the LAN 205 or through the LAN 205 and a WAN (Wide Area Network) such as an internet. The receiving unit receives data from an external apparatus through the LAN 205 or through the LAN 205 and the WAN.

The operation panel unit 102 may include an operation unit 1021 and a display unit 1022. The operation unit 1021 receives an input signal based on a user input. The operation unit 1021 may be a touch panel or a keyboard.

The display unit 1022 displays various information for a user. The display unit 1022 may be a touch panel or LCD (Liquid Crystal Display).

The memory unit 103 may be a HDD (Hard Disk Drive) or a flash memory. The memory unit 103 stores various software such as a control program (software) that controls the entire image forming apparatus 100 or application software.

The printing unit 104 forms an image on a sheet based on image data that is transmitted from an external apparatus. The printing unit 104 forms an image on a sheet based on image data that is generated by an image processing unit 1051.

The control unit 105 may include a CPU (Central Processing Unit) and a RAM (Random Access Memory). The control unit 105 read the software from the memory unit 103. The control unit 105 writes the software in the RAM.

The control unit 105 controls the entire image forming apparatus 110 based on the written software.

The control unit 105 may include the image processing unit 1051, a connection management unit 1052, connection management information 1053, and a maintenance management unit 1054.

The image processing unit 1051 generates image data based on scan data that a scanner scans a manuscript to generate.

The connection management unit 1052 as a restricting unit manages communication with an external apparatus based on connection management information 1053. The connection management unit 1052 restricts communication with an external apparatus.

The connection management information 1053 indicates connection state of an external apparatus.

The maintenance management unit 1054 as a management unit manages a plurality of modes of the image forming apparatus 100. The modes include a first mode and a second mode. The first mode may be a normal mode. The second mode may be a remote maintenance mode.

The remote maintenance mode is a mode for remote maintenance that the image forming apparatus 100 executes processing for maintenance of the image forming apparatus 100 based on an instruction signal transmitted from an operator terminal 204 as the external apparatus through the LAN 205 and the WAN.

The normal mode is a mode different from the remote maintenance. The normal mode is a mode for print processing that the image forming apparatus 100 forms an image on a sheet based on an instruction signal transmitted from a user terminal 200 through the LAN 205, where the user terminal 200 is the external apparatus.

Specifically, the maintenance management unit 1054 shifts a current mode of the image forming apparatus from the normal mode to the remote maintenance mode. The maintenance management unit 1054 shifts the current mode of the image forming apparatus from the remote maintenance mode to the normal mode.

When operation unit 1021 receives the input signal based on the user input for starting the remote maintenance, the control unit 105 controls the maintenance management unit 1054 to shift the current mode of the image forming apparatus 100 from the normal mode to the remote maintenance mode. The control unit 105 controls the communication unit 100 to transmit connection request data to the operator terminal 204. The control unit 105 controls the restricting unit to restrict the communication with the user terminal 200 based on the connection management information 1053.

Figure 2:
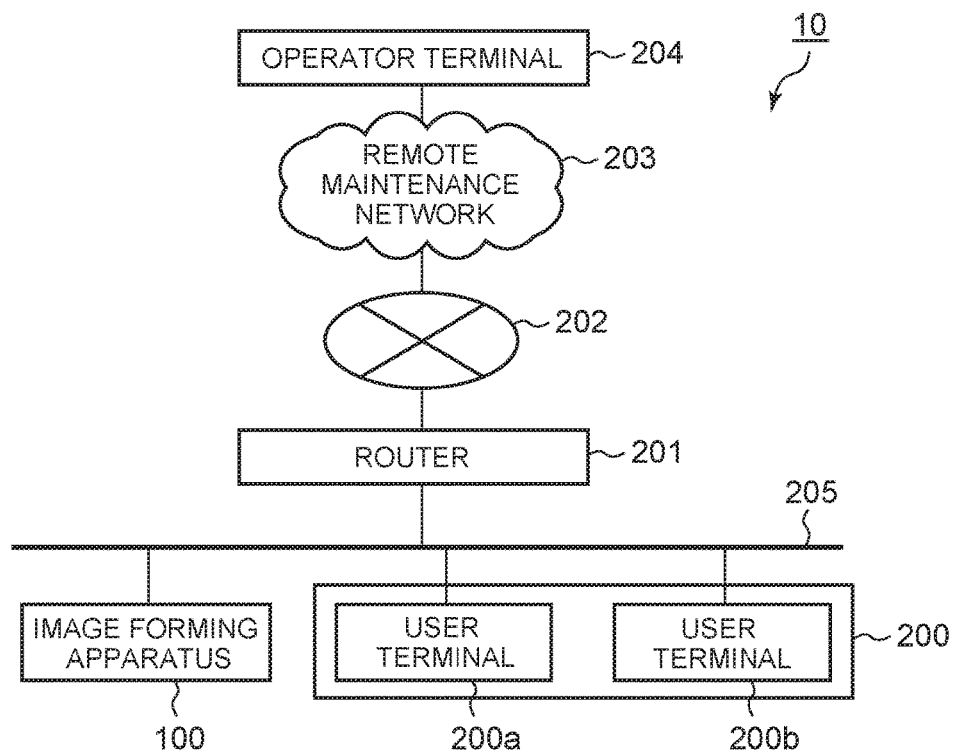
FIG. 2 is a block diagram showing a configuration of a remote maintenance system according to the first embodiment.

FIG. 2 is a block diagram showing a configuration of a remote maintenance system 10.

As shown in FIG. 2, the remote maintenance system 10 may include the image forming apparatus 100, the user terminal 200 (200*a*, 200*b*), and the operator terminal 204 that is used during the remote maintenance. The operator terminal 204 is a maintenance apparatus. The image forming apparatus 100 is connected to the user terminal 200 (200*a*, 200*b*) through the LAN 205. The image forming apparatus 100 and the user terminal 200 (200*a*, 200*b*) are connected to the operator terminal 204 through the LAN 205, a router 201 as a repeater, an internet 202 as the WAN, and the remote maintenance network 202.

In this example, TCP/IP (Transmission Control Protocol) is used for the communication of each device.

The user terminal 200 (200*a*, 200*b*) may be a PC (personal Computer). The user terminal 200 transmits print instruction information, including image data for causing the image forming apparatus 100 to form the image on the sheet, to the image forming apparatus 100.

In this example, it is explained as the number of the user terminal 200 is "2". However, the number of the user terminal 200 is not limited to "2".

The router 201 is the repeater that connects the internet 202 and the LAN 205. The router 201 restricts an unauthorized connection from the internet 202 to the LAN 205. Namely, the router 201 functions as a fire wall.

The operator terminal 204 may be a PC. The operator terminal 204 transmits maintenance instruction information to the image forming apparatus 100 through the router 201. The image forming apparatus 100 executes processing for maintenance of the image forming apparatus 100 based on the maintenance instruction information (the instruction signal).

The image forming apparatus 110 transmits the connection request data to the operator terminal 204 by using the communication unit 101. Then the image forming apparatus receives connection reply data to the connection request data from the operator terminal 204 by using the communication unit 101. Then the image forming apparatus establishes a connection with the operator terminal 204.

In the normal mode, the image forming apparatus 100 communicates with the user terminal 200 (200*a*, 200*b*). The image forming apparatus 100 receives the print instruction information from the user terminal 200. The image forming apparatus 100 forms the image on the sheet based on the print instruction information.

On the other hand, in the remote maintenance mode, the image forming apparatus 100 communicates with the operator terminal 204 through the router 201. The image forming apparatus 100 receives the maintenance instruction information from the operator terminal 204. The image forming apparatus 100 executes processing for maintenance of the image forming apparatus 100 based on the maintenance instruction information.

FIG. 3 is a schematic view showing the connection management information 1053.

The connection management information 1053 is for managing connection with the user terminal 200. The connection management information 1053 stores the RAM included by the control unit 105. The connection management information 1053 may store the memory unit 103.

As shown in FIG. 3, the connection management information 1053 includes one or more records, each of which includes a number item 1053*a* of a record, an IP address item 1053*b* of a record, and a port item 1053*c* of a record.

The number item 1053*a* is a number assigned to each of the records included by the connecting management information 1053.

The IP address item 1053*b* is an IP address assigned to each of the user terminals 200 that are connecting to the image forming apparatus 100 through the LAN 205.

The port item 1053*c* is a port number that each of the user terminals 200 is connected to. The port number is used in a TCP/IP protocol. For example, a port number "20" indicates a FTP (File Transfer Protocol). A port number "23" indicates a Telnet (Teletype network). A port number "515" indicates LPR (Line Printer daemon Protocol).

FIG. 4 is a flowchart showing mode shift processing executed by the image forming apparatus 100.

First, when operation unit 1021 receives the input signal based on the user input, the control unit 105 controls the display unit 1022 to display a remote maintenance start screen 400.

Figure 6:
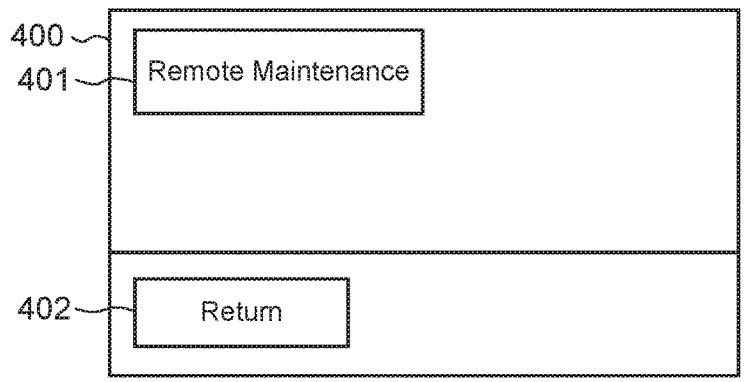
FIG. 6 is a schematic view showing a remote maintenance start screen.

FIG. 6 is a schematic view showing the remote maintenance start screen 400. The remote maintenance start screen 400 may include a remote maintenance icon 401 and a return icon 402. If the remote maintenance icon 401 is pushed, the remote maintenance processing is started. If the return icon 402 is pushed, an initial screen such as a menu screen is displayed on the display unit 1022.

As shown in FIG. 4, if operation unit 1021 receives an input signal based on a user input by pushing the remote maintenance icon 401 (step S101: YES), the control unit 105 moves the process to step S102.

The control unit 105 controls the display unit 1022 to display a confirmation screen 500 (step S102). The confirmation screen 500 is for confirming that the connection between the image forming apparatus 100 and the user terminal 200 is going to be disconnected.

Figure 7:
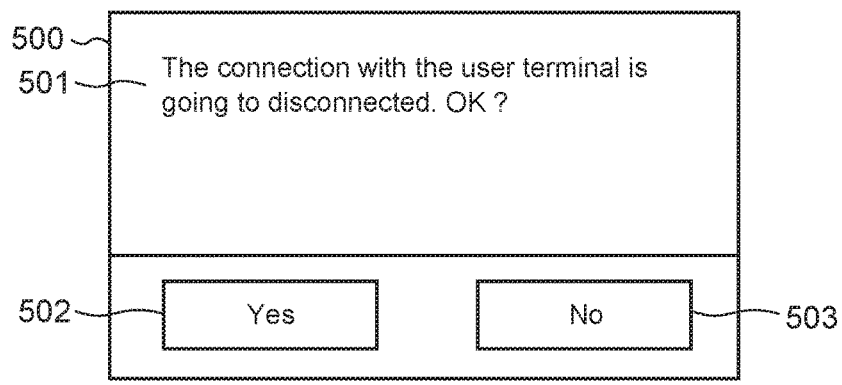
FIG. 7 is a schematic view showing a confirmation screen.

FIG. 7 is a schematic view showing the confirmation screen 500. The confirmation screen 500 may include a message area 501, a yes icon 502, and a no icon 503. The message area 501 displays a message "The connection with the user terminal is going to be disconnected. OK?". The yes icon 502 is for executing the disconnection. The no icon 503 is for canceling the remote maintenance processing without executing the disconnection.

As shown in FIG. 4, if operation unit 1021 receives an input signal based on a user input by pushing the yes icon 502 (step S103: YES), the control unit 105 moves the process to step S104. On the other hand, if operation unit 1021 receives an input signal based on a user input by pushing the no icon 503 (step S103: NO), the control unit 105 finishes the process.

The connection management unit 1052 disconnects the connection with the all user terminals 200 corresponding to IP addresses that are listed by the IP address 1053b of the connection management information 1053 (step S104). Specifically, the connection management unit 1052 disconnects the connection with the user terminal 200a corresponding to IP address "192.168.1.1" and the user terminal 200b corresponding to IP address "192.168.1.2".

Figure 9:
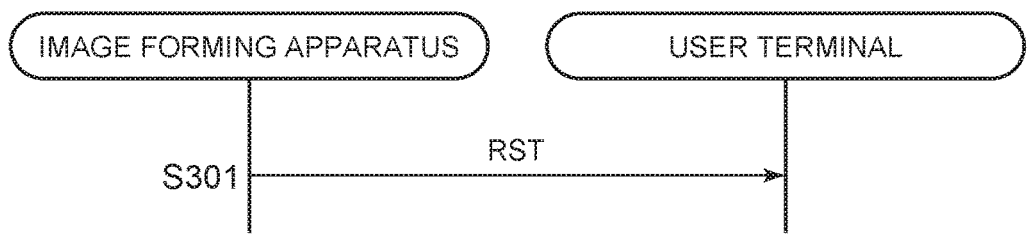
FIG. 9 is a sequence diagram showing disconnection processing.

As shown FIG. 9, the communication unit 101 transmits RST packets (disconnection request data) to the all connected user terminals 200 (200a and 200b) (step S301). Then the image forming apparatus 100 disconnects the connection with all connected user terminals 200. The forming apparatus 100 may disconnect the connection with a part of all connected user terminals 200.

As shown FIG. 4, the control unit 105 closes all ports (step S105). This is to prevent the image forming apparatus 100 from accepting a connection from the user terminal 200. In this example, the control unit 105 closes all ports. However, the control unit 105 may close only a predetermined port which influences the remote maintenance. Or, the control unit 105 may leave open a predetermined port which is set beforehand.

The connection management unit 1052 establishes a connection with the operator terminal 204 through the remote maintenance network 203 (step S106).

Figure 10:
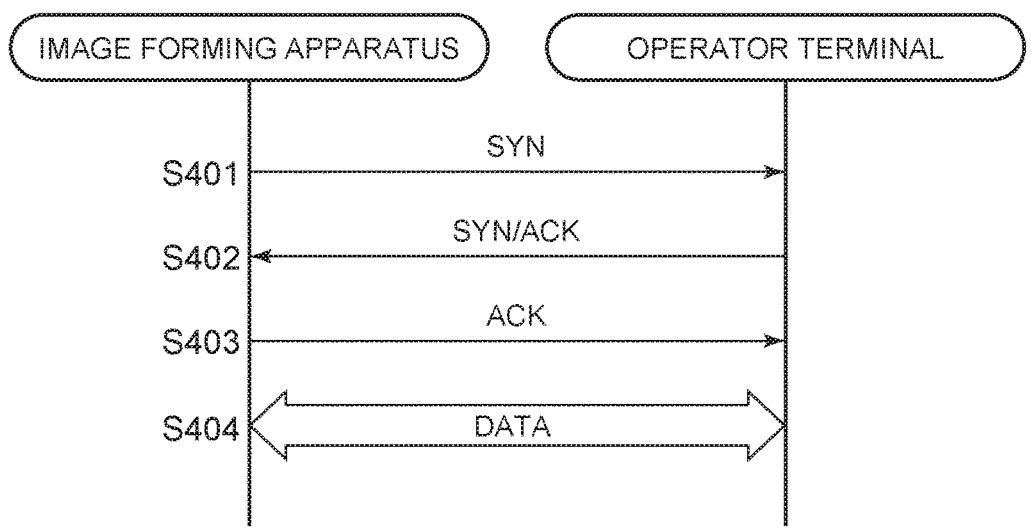
FIG. 10 is a sequence diagram showing connection processing.

As shown FIG. 10, the communication unit 101 transmits SYN packets (connection request information) to the operator terminal 204 (step S401). The operator terminal 204 receives the SYN packets. Then the operator terminal 204 transmits SYN/ACK packets to the image forming apparatus 100. The image forming apparatus 100 receives the SYN/ACK packets (step S402). Then the image forming apparatus 100 transmits ACK packets to the operator terminal 204 (step S403). The operator terminal 204 receives the ACK packets. Due to this, a connection between the image forming apparatus 100 and the operator terminal 204 is established. Then, the transmission and reception of data is enabled between the image forming apparatus 100 and the operator terminal 204 by using HTTP (Hypertext Transfer Protocol) and so on (step S404).

The order of S104, S105 and S106 is exemplary since the three steps can be performed in any order.

As shown FIG. 4, the maintenance management unit 1054 shifts the current mode from the normal mode to the remote maintenance mode (step S107). Then the control unit 105 controls the display unit 1022 to display a remote maintenance screen 600. The remote maintenance screen 600 only receives a user input related to the remote maintenance. Therefore, the image forming apparatus 100 is able to prevent the use of the user through the operation panel unit 102 while the remote maintenance is executed.

Figure 8:
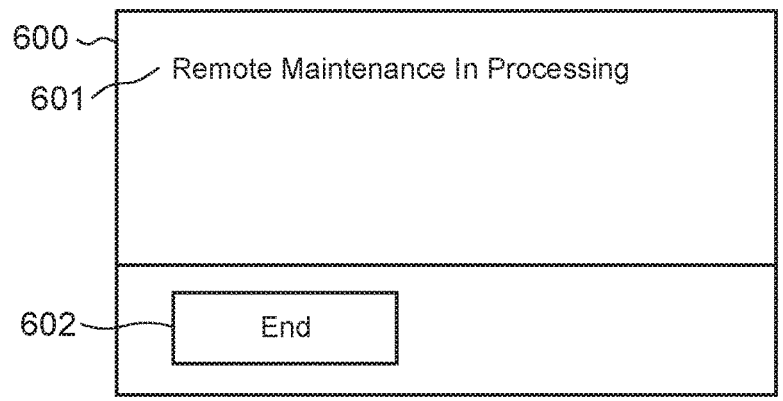
FIG. 8 is a schematic view showing a remote maintenance screen.

FIG. 8 is a schematic view showing the remote maintenance screen 600 displayed in the display unit 1022. The remote maintenance screen 600 may include a message area 601 and an end icon 602. The message area 601 displays a message "remote maintenance in progress". The end icon 602 is for finishing the remote maintenance processing.

As shown in FIG. 4, after the maintenance management unit 1054 shifts the current mode from the normal mode to the remote maintenance mode (step S107) and the control unit 105 controls the display unit 1022 to display the remote maintenance screen 600, the control unit 105 finishes the process.

The image forming apparatus 100 that shifts the current mode from the normal mode to the remote maintenance mode restricts communication with all (or some) external apparatuses except the operator terminal 204. Therefore, the image forming apparatus 100 is able to prevent the use of the user from the external apparatuses.

Figure 5:
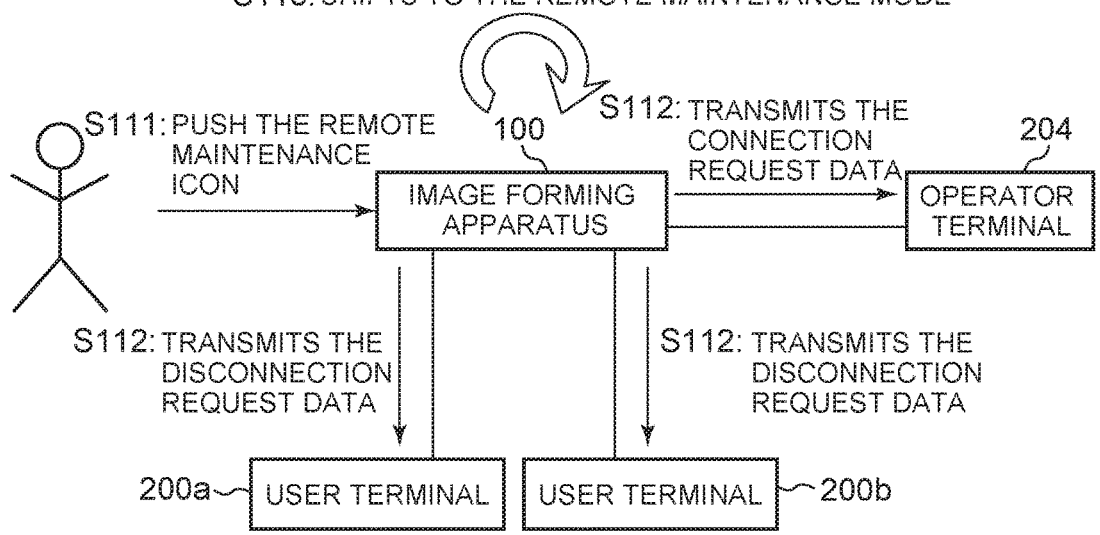
FIG. 5 is a block diagram showing the mode shift processing according to the first embodiment.

FIG. 5 is a block diagram showing the mode shift processing.

As shown in FIG. 5, the image forming apparatus 100 receives an input signal based on a user input by pushing the remote maintenance icon 401 in the remote maintenance start screen 1022 (step S111). This process corresponds to S101 shown in FIG. 4.

Then the image forming apparatus 100 disconnects the connection with the user terminal 200a and the user terminal 200b. The image forming apparatus 100 establishes connection with the operator terminal 204. Namely, the image forming apparatus 100 transmits the disconnection request data to the user terminal 200a and the user terminal 200b. And the image forming apparatus 100 transmits the connection request data to the operator terminal 204 (step S112). This process corresponds to S104, S105, and S106 shown in FIG. 4.

Then the image forming apparatus 100 shifts the current mode from the normal mode to the remote maintenance mode (step S113). This process corresponds to S107 shown in FIG. 4.

In this way, the image forming apparatus 100 is able to prevent the use of the user from the external apparatus except the operator terminal 204 while the remote maintenance is executed. Therefore, the remote maintenance is certainly executed.

2. Second Embodiment

Figure 11:
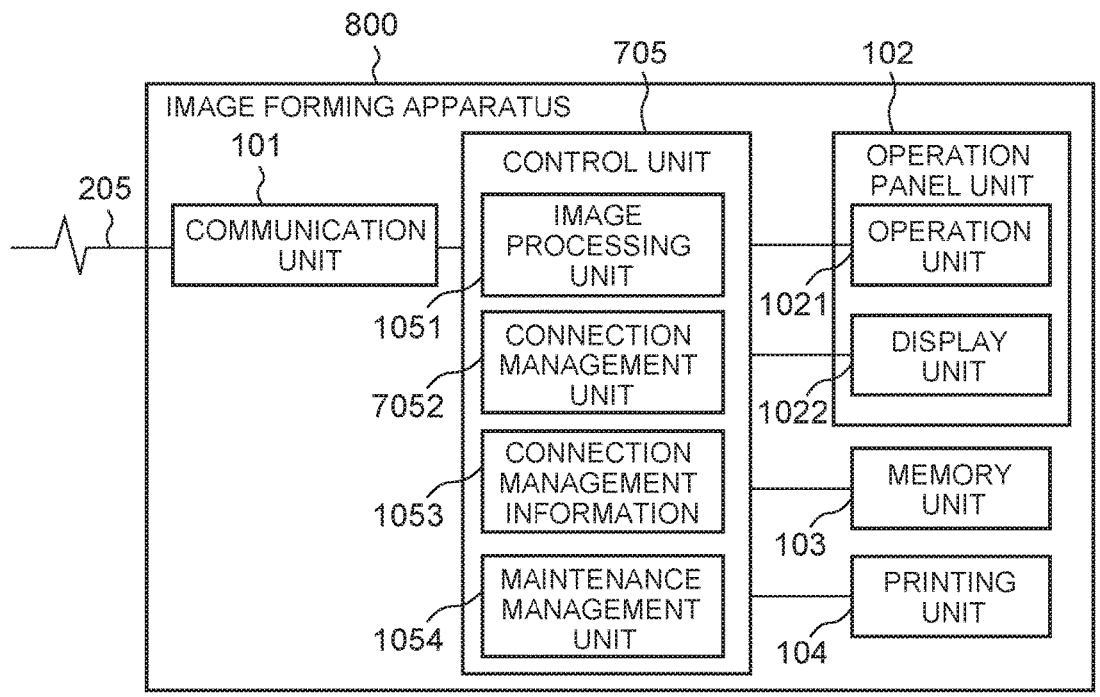
FIG. 11 is a block diagram showing a configuration of an image forming apparatus according to a second embodiment.

FIG. 11 is a block diagram showing a configuration of an image forming apparatus 800.

As shown in FIG. 11, the image forming apparatus 800 is connected to a LAN 205 as a communication line. The image forming apparatus 800 may be a multifunction machine.

The image forming apparatus 800 may include a communication unit 101, an operation panel unit 102, a memory unit 103, a printing unit 104, and a control unit 705.

The communication unit 101, the operation panel unit 102, the memory unit 103, and the printing unit 104 are same as the structures in the first embodiment.

The control unit 705 may include a CPU and a RAM. The control unit 705 read the software from the memory unit 103. The control unit 705 writes the software in the RAM. The control unit 705 controls the entire image forming apparatus 800 based on the written software.

The control unit 705 may include the image processing unit 1051, a connection management unit 7052, connection management information 1053, and a maintenance management unit 1054.

The image processing unit 1051, the connection management information 1053, and the maintenance management unit 1054 are same as the structures in the first embodiment.

The connection management unit 7052 manages communication with an external apparatus based on connection management information 1053. The connection management unit 7052 restricts communication with an external apparatus.

Figure 12:
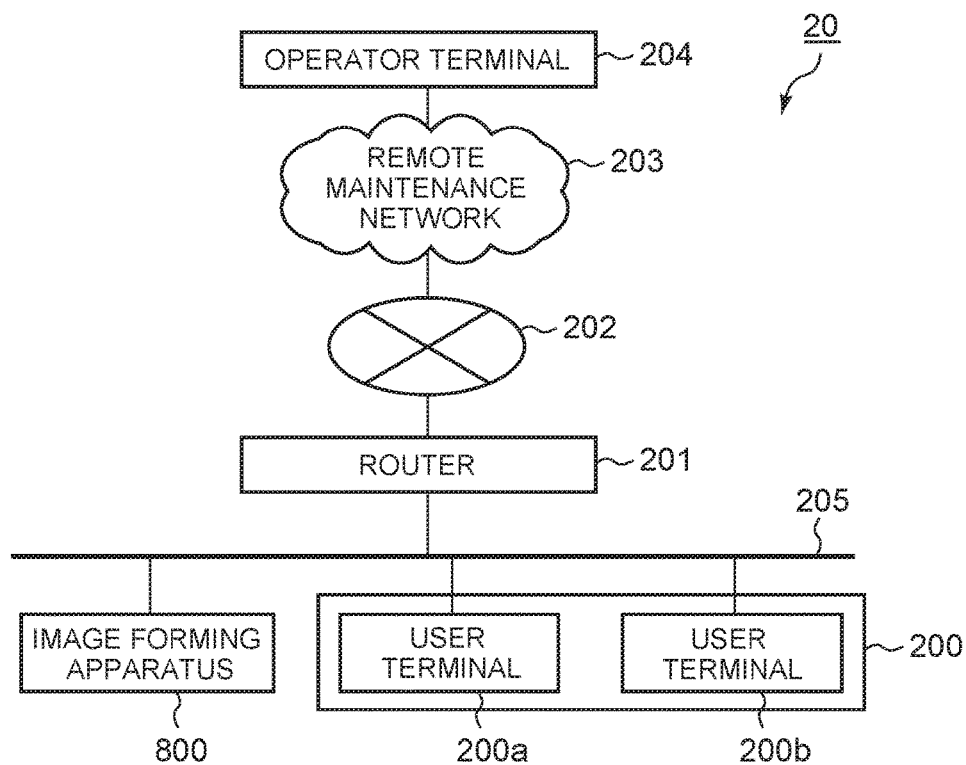
FIG. 12 is a block diagram showing a configuration of a remote maintenance system according to the second embodiment.

FIG. 12 is a block diagram showing a configuration of a remote maintenance system 20.

As shown in FIG. 12, the remote maintenance system 20 may include the image forming apparatus 800, the user terminal 200 (200a, 200b), and the operator terminal 204. The image forming apparatus 800 is connected to the user terminal 200 (200a, 200b) through the LAN 205. The image forming apparatus 100 and the user terminal 200 (200a, 200b) are connected to the operator terminal 204 through the LAN 205, a router 201, an internet 202, and the remote maintenance network 202.

The user terminal 200 (200a, 200b), the router 201, and the operator terminal 204 are the same as the structures in the first embodiment.

Figure 13:
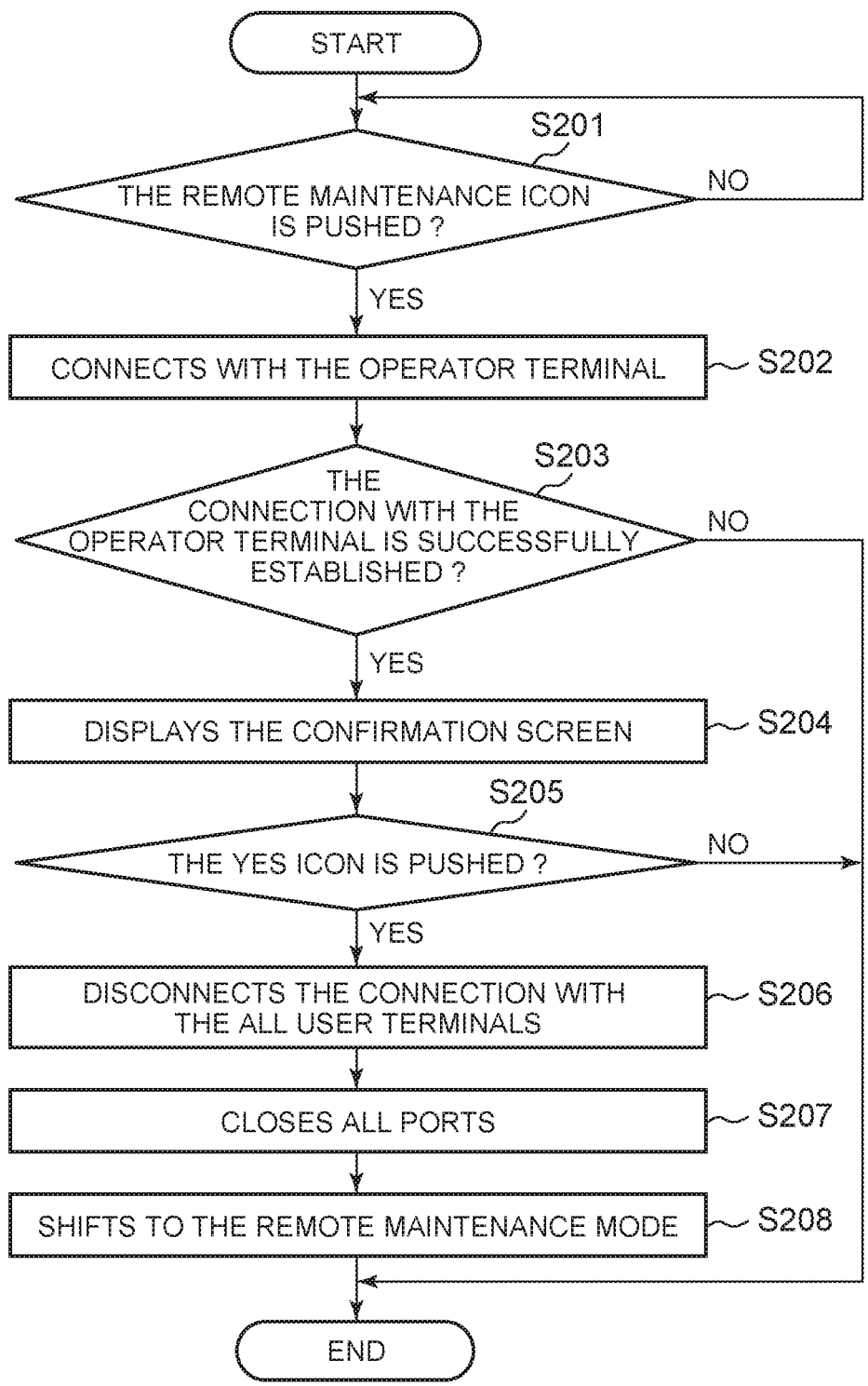
FIG. 13 is a flowchart showing mode shift processing executed by the image forming apparatus according to the second embodiment.

FIG. 13 is a flowchart showing mode shift processing executed by the image forming apparatus 800.

First, when operation unit 1021 receives the input signal based on the user input, the control unit 105 controls the display unit 1022 to display a remote maintenance start screen 1022 showed in FIG. 6.

As shown in FIG. 13, if operation unit 1021 receives an input signal based on a user input by pushing the remote maintenance icon 401 (step S201: YES), the control unit 705 moves the process to step S202.

The connection management unit 7052 establishes a connection with the operator terminal 204 through the remote maintenance network 203 (step S202).

The connection management unit 7052 determines whether the connection is successfully established (step S203). If the connection management unit 7052 determines that the connection is successfully established (step S203: YES), the control unit 705 moves the process to the step S204. If the connection management unit 7052 determines that the connection is not successfully established (step S203: NO), the control unit 705 finished the process.

If the communication unit 101 receives the SYN/ACK packets from the operator terminal 204, the connecting management unit 7052 determines that the connection is successfully established.

If the communication unit 101 does not receive the SYN/ACK packets from the operator terminal 204 in a preset time, the connecting management unit 7052 determines that the connection is not successfully established.

The control unit 708 controls the display unit 1022 to display a confirmation screen 500 (step S204).

If operation unit 1021 receives an input signal based on a user input by pushing the yes icon 505 (step S205: YES), the control unit 705 moves the process to step 206. On the other hand, if operation unit 1021 receives an input signal based on a user input by pushing the no icon 503 (step S205: NO), the control unit 705 finished the process.

As a result, if operation unit 1021 receives the input signal based on a user input by pushing the remote maintenance icon 401 and the connection with the operator terminal 204 is successfully established, the connection management unit 7052 restricts the communication with the user terminal 200.

The process of S206, S207 and S208 is done in the same way as the process of S104, S105 and S107 shown in FIG. 4. Therefore these explanations are omitted.

The order of S206 and S207 is exemplary since the two steps can be performed in any order.

After S208 is executed, the control unit 705 finished the process.

Figure 14:
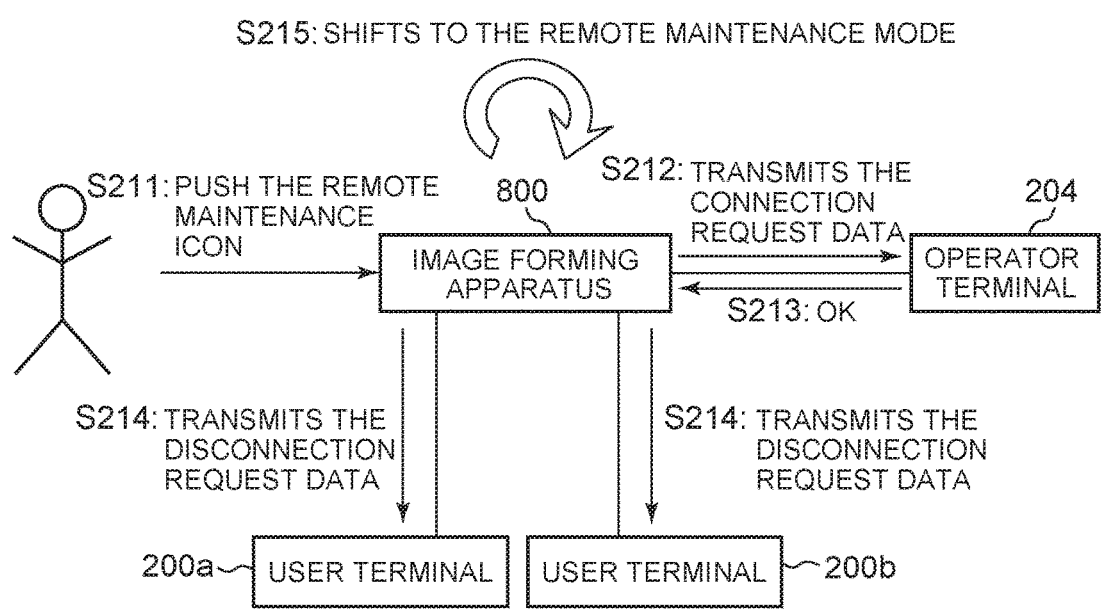
FIG. 14 is a block diagram showing the mode shift processing according to the second embodiment.

FIG. 14 is a block diagram showing the mode shift processing.

As shown in FIG. 14, the image forming apparatus 800 receives an input signal based on a user input by pushing the remote maintenance icon 401 in the remote maintenance start screen 1022 (step S211). This process corresponds to S201 shown in FIG. 13.

Then the image forming apparatus 800 transmits the connection request data (SYN packets) to the operator terminal 204 (step S212). This process corresponds to S202 shown in FIG. 13.

The image forming apparatus 800 receives acknowledgement data (SYN/ACK packets) from the operator terminal 204 (step S213). This process corresponds to S202 shown in FIG. 13.

Then the image forming apparatus 800 transmits the disconnection request data (RST packets) to the user terminal 200a and the user terminal 200b (step S214). Then the image forming apparatus 800 disconnects with the user terminal 200a and the user terminal 200b. The image forming apparatus 800 closes the all ports. This process corresponds to S206 and S207 shown in FIG. 13.

The order of steps is exemplary since the disconnection and closing of ports can be performed in any order.

In the second embodiment, the image forming apparatus 800 connects to the operator terminal 204. After the image forming apparatus 800 determines that the connection is successfully established, the image forming apparatus 800 disconnects the connection with the user terminal 200 and closes the ports. Then the image forming apparatus 800 shifts the current mode from the normal mode to the remote maintenance mode.

Therefore, the image forming apparatus 800 is able to prevent the user from using the external apparatuses while the remote maintenance is executed.

Furthermore, the image forming apparatus 800 is prevented from disconnecting the connection with the user terminal 200, if the maintenance connection has not been established.

In the first embodiment and the second embodiment, the image forming apparatus is explained as the multifunction machine. However, the image forming apparatus may be a printer, a copy apparatus or a FAX apparatus.

The present invention is not limited to the foregoing embodiment but many modifications and variations are possible within the spirit and scope of the appended claims of the invention.

What is claimed is:

1. An image forming apparatus comprising:
    a central processing unit (CPU), and
    a storage medium having program instructions stored thereon, execution of which by the CPU causes the image forming apparatus to provide functions of:
        an operation unit that receives an input signal based on a user input, and
        a management unit that manages a plurality of modes of the image forming apparatus, the plurality of modes including a first mode and a second mode, wherein the second mode is for remote maintenance; and
    a transceiver configured to transmit connection request data to a maintenance apparatus and receive connection reply data from the maintenance apparatus in response to the connection request data,
    wherein the execution of the program instructions by the CPU causes the image forming apparatus to further provide functions of:
        a restricting unit that restricts communication with an external apparatus; and
        a control unit that
            controls the management unit to shift a current mode of the image forming apparatus from the first mode to the second mode in response to receiving the input signal,
            controls the transceiver to transmit the connection request data to the maintenance apparatus in response to receiving the input signal, and
            controls the restricting unit to restrict the communication with the external apparatus in response to the transceiver receiving the connection reply data.

2. The image forming apparatus according to claim 1, wherein when the current mode is the second mode, the operation unit only receives an input signal based on a user input related to the remote maintenance.

3. The image forming apparatus according to claim 1, further comprising:
    a display configured to display information that the remote maintenance has been performed, when the current mode is the second mode.

4. The image forming apparatus according to claim 1, wherein the execution of the program instructions by the CPU causes the image forming apparatus to further provide functions of:
    a memory unit that stores connection management information including address information of the external apparatus connected to the image forming apparatus;
    wherein the control unit controls the restricting unit to restrict the communication with the external apparatus based on the connection management information.

5. The image forming apparatus according to claim 4, wherein the restricting unit disconnects communication with the external apparatus based on the address information included in the connection management information.

6. The image forming apparatus according to claim 5, wherein the connection management information includes port information related to a port for communication with the external apparatus; and
    wherein the restricting unit closes the port.

7. The image forming apparatus according to claim 6, wherein the restricting unit closes the port after disconnecting the communication with the external apparatus.

8. The image forming apparatus according to claim 1, wherein the management unit shifts the current mode from the first mode to the second mode after the restricting unit restricts the communication with the external apparatus.

9. The image forming apparatus according to claim 1, wherein the image forming apparatus is connected to the external apparatus through a LAN; and
    wherein the image forming apparatus is connected to the maintenance apparatus through a LAN, a WAN, and a router connecting the LAN and the WAN, and the router restricts an unauthorized connection from the WAN to the LAN.

10. The image forming apparatus according to claim 1, wherein the control unit controls the restricting unit to restrict the communication with the external apparatus only if a response has been received from the maintenance apparatus.

11. The image forming apparatus according to claim 1, wherein the connection reply data includes a SYN/ACK packet.

12. The image forming apparatus according to claim 1, wherein when the current mode is the second mode, the operation unit restricts receiving an input signal based on a user input unrelated to the remote maintenance.

13. An image forming apparatus comprising:
    a central processing unit (CPU), and
    a storage medium having program instructions stored thereon, execution of which by the CPU causes the image forming apparatus to provide functions of:
        an operation unit that receives an input signal based on a user input, and
        a management unit that manages a plurality of modes of the image forming apparatus, the plurality of modes including a first mode and a second mode, wherein the second mode is for remote maintenance;
    a transceiver configured to transmit connection request data to a maintenance apparatus;
    wherein the execution of the program instructions by the CPU causes the image forming apparatus to further provide functions of:
        a restricting unit that restricts communication with an external apparatus; and
        a control unit that
            controls the management unit to shift a current mode of the image forming apparatus from the first mode to the second mode in response to receiving the input signal,
            controls the transceiver to transmit the connection request data to the maintenance apparatus in response to receiving the input signal, and
            controls the restricting unit to restrict the communication with the external apparatus in response to receiving the input signal; and
    a display configured to display information that the remote maintenance has been performed, when the current mode is the second mode.

14. The image forming apparatus according to claim 13, wherein the transceiver is further configured to receive connection reply data in response to the connection request data from the maintenance apparatus; and
    wherein the control unit controls the restricting unit to restrict the communication with the external apparatus in response to the transceiver receiving the connection reply data.

15. The image forming apparatus according to claim 14, wherein the management unit shifts the current mode from the first mode to the second mode after the restricting unit restricts the communication with the external apparatus.

16. The image forming apparatus according to claim 14, wherein the connection reply data includes a SYN/ACK packet.

17. The image forming apparatus according to claim 13, wherein when the current mode is the second mode, the operation unit only receives an input signal based on a user input related to the remote maintenance.

18. The image forming apparatus according to claim 13, wherein the execution of the program instructions by the CPU causes the image forming apparatus to further provide functions of:
a memory unit that stores connection management information including address information of the external apparatus connected to the image forming apparatus;
wherein the control unit controls the restricting unit to restrict the communication with the external apparatus based on the connection management information.

19. The image forming apparatus according to claim 18, wherein the restricting unit disconnects communication with the external apparatus based on the address information included in the connection management information.

20. The image forming apparatus according to claim 19, wherein the connection management information includes port information related to a port for communication with the external apparatus; and
wherein the restricting unit closes the port.

21. The image forming apparatus according to claim 20, wherein the restricting unit closes the port after disconnecting the communication with the external apparatus.

22. The image forming apparatus according to claim 13, wherein the management unit shifts the current mode from the first mode to the second mode after the transceiver transmits the connection request data to the maintenance apparatus and after the restricting unit restricts the communication with the external apparatus.

23. The image forming apparatus according to claim 13, wherein the image forming apparatus is connected to the external apparatus through a LAN; and
wherein the image forming apparatus is connected to the maintenance apparatus through a LAN, a WAN, and a router connecting the LAN and the WAN, and the router restricts an unauthorized connection from the WAN to the LAN.

24. The image forming apparatus according to claim 13, wherein the control unit controls the restricting unit to restrict the communication with the external apparatus only if a response has been received from the maintenance apparatus.

25. The image forming apparatus according to claim 13, wherein when the current mode is the second mode, the operation unit restricts receiving an input signal based on a user input unrelated to the remote maintenance.

26. An image forming apparatus comprising:
a central processing unit (CPU), and
a storage medium having program instructions stored thereon, execution of which by the CPU causes the image forming apparatus to provide functions of:
an operation unit that receives an input signal based on a user input, and
a management unit that manages a plurality of modes of the image forming apparatus, the plurality of modes including a first mode and a second mode, wherein the second mode is for remote maintenance; and
a transceiver configured to transmit connection request data to a maintenance apparatus,
wherein the execution of the program instructions by the CPU causes the image forming apparatus to further provide functions of:
a restricting unit that restricts communication with an external apparatus; and
a control unit that
controls the management unit to shift a current mode of the image forming apparatus from the first mode to the second mode in response to receiving the input signal,
controls the transceiver to transmit the connection request data to the maintenance apparatus in response to receiving the input signal, and
controls the restricting unit to restrict the communication with the external apparatus in response to receiving the input signal; and
wherein the management unit shifts a current mode of the image forming apparatus from the first mode to the second mode, after the transceiver transmits the connection request data to the maintenance apparatus and after the restricting unit restricts the communication with the external apparatus.

27. The image forming apparatus according to claim 26, wherein the transceiver is further configured to receive connection reply data in response to the connection request data from the maintenance apparatus; and
wherein the control unit controls the restricting unit to restrict the communication with the external apparatus in response to the transceiver receiving the connection reply data.

28. The image forming apparatus according to claim 27, wherein the connection reply data includes a SYN/ACK packet.

29. The image forming apparatus according to claim 26, wherein when the current mode is the second mode, the operation unit only receives an input signal based on a user input related to the remote maintenance.

30. The image forming apparatus according to claim 26, further comprising:
a display configured to display information that the remote maintenance has been performed, when the current mode is the second mode.

31. The image forming apparatus according to claim 26, wherein the execution of the program instructions by the CPU causes the image forming apparatus to further provide functions of:
a memory unit that stores connection management information including address information of the external apparatus connected to the image forming apparatus;
wherein the control unit controls the restricting unit to restrict the communication with the external apparatus based on the connection management information.

32. The image forming apparatus according to claim 31, wherein the restricting unit disconnects communication with the external apparatus based on the address information included in the connection management information.

33. The image forming apparatus according to claim 32, wherein the connection management information includes port information related to a port for communication with the external apparatus; and
wherein the restricting unit closes the port.

34. The image forming apparatus according to claim 33, wherein the restricting unit closes the port after disconnecting the communication with the external apparatus.

35. The image forming apparatus according to claim 26, wherein the image forming apparatus is connected to the external apparatus through a LAN; and
wherein the image forming apparatus is connected to the maintenance apparatus through a LAN, a WAN, and a router connecting the LAN and the WAN, and the router restricts an unauthorized connection from the WAN to the LAN.

36. The image forming apparatus according to claim 26, wherein the control unit controls the restricting unit to restrict the communication with the external apparatus only if a response has been received from the maintenance apparatus.

37. The image forming apparatus according to claim 26, wherein when the current mode is the second mode, the operation unit restricts receiving an input signal based on a user input unrelated to the remote maintenance.

38. A method of restricting communication executed by an image forming apparatus, comprising:
receiving an input signal by the image forming apparatus; and
in response to the input signal:
shifting a current mode of the image forming apparatus from a first mode to a second mode, wherein the second mode is for remote maintenance,
transmitting, by the image forming apparatus, connection request data to a maintenance apparatus, and
restricting, by the image forming apparatus, communication with an external apparatus, the external apparatus being different from the maintenance apparatus to which the connection request data is transmitted by the image forming apparatus, wherein when the current mode is the second mode, the image forming apparatus displays information that the remote maintenance has been performed.

39. The method of restricting communication according to claim 38, further comprising:
receiving, by the image forming apparatus, connection reply data in response to the connection request data from the maintenance apparatus, wherein the communication with the external apparatus is restricted in response to receiving the connection reply data.

40. The method of restricting communication according to claim 39, wherein the current mode is shifted from the first mode to the second mode after the communication with the external apparatus is restricted.

41. The method of restricting communication according to claim 38, further comprising, when the current mode is the second mode, only receiving an input signal related to the remote maintenance.

42. The method of restricting communication according to claim 38, further comprising;
displaying, by the image forming apparatus, information that the remote maintenance has been performed, when the current mode is the second mode.

43. The method of restricting communication according to claim 38, wherein the current mode is shifted from the first mode to the second mode after the connection request data is transmitted by the image forming apparatus to the maintenance apparatus and after the communication with the external apparatus is restricted.

44. The method of restricting communication according to claim 38, wherein the communication with the external apparatus is restricted by the image forming apparatus only if a response has been received from the maintenance apparatus.

45. The method of restricting communication according to claim 38, further comprising, when the current mode is the second mode, restricting by the image forming apparatus, receiving an input signal based on a user input unrelated to the remote maintenance.

* * * * *